United States Patent [19]
Zedell, Jr. et al.

[11] Patent Number: 6,068,946
[45] Date of Patent: May 30, 2000

[54] DUAL COVER BATTERY CASING

[75] Inventors: Karl F. Zedell, Jr., Atlanta, Ga.; James R. Schilling, Largo, Fla.

[73] Assignee: Motorola, Inc., Schaumburg, Ill.

[21] Appl. No.: 09/127,799

[22] Filed: Aug. 2, 1998

[51] Int. Cl.[7] .................................................. H01M 2/10
[52] U.S. Cl. ........................... 429/100; 429/96; 206/703; 206/705
[58] Field of Search .............................. 429/100, 99, 96; 206/705, 703

[56] References Cited

U.S. PATENT DOCUMENTS

| | | | |
|---|---|---|---|
| 5,432,017 | 7/1995 | Hassemer et al. | 429/99 X |
| 5,436,088 | 7/1995 | Castameda et al. | 429/96 |
| 5,673,180 | 9/1997 | Pernet | 429/100 X |

*Primary Examiner*—John S. Maples
*Attorney, Agent, or Firm*—Felipe Farley; Philip Burrus

[57] ABSTRACT

A battery housing is described comprising a frame, a top cover, and a bottom cover, wherein the frame has a ledge at its bottom, and an arch formed on one or more walls of the frame. The top cover has one or more rod-shaped projections protruding downward from the bottom side of the top cover, each projection having a ridge at the distal end of the projection. The bottom cover of the housing is wedged between the ledge and the arch, and the top cover of the housing fits onto the frame. Each rod is slid through a corresponding opening in the arch, and the ridge at the distal end of each rod slides through and past the opening of each arch, locking the rod in place vis-a-vis the arch.

4 Claims, 4 Drawing Sheets

DUAL COVER BATTERY CASING

TECHNICAL FIELD

This invention relates in general to housings for electronic devices and more particularly housings for battery cells.

BACKGROUND OF THE INVENTION

In portable electronic communication devices there has been a steady trend toward decreasing physical size. Designers are therefore challenged to miniaturize all housing components, without decreasing reliability, and without increasing costs. Hand-carried electronic communication devices are typically battery operated, and include a housing. Typically the housing is made in two or more parts which are held together by screws or other removable fasteners, so that the fasteners can be removed to provide access to the internal components of the device. A problem with screws and other releasable fasteners is the time required to install them during initial assembly of the device. Furthermore, screws and other removable fasteners may be lost. However, the thinner the housing, the less room there is for a robust mechanical connection via snap connectors.

Therefore, there is a need for an improved housing for an electronic device using snap connectors.

DETAILED DESCRIPTION OF THE PREFERRED EMBODIMENT

The present invention is a dual cover housing for an electronic device comprising a frame, a top cover, and a bottom cover. The inner circumstance of the frame has one or more small arches extending from one or more walls of the frame. Each arch has an opening between the arch and the wall of the frame. The frame also has a bottom ledge which forms an L-shape with the wall of the frame. The top cover has one or more rods, each with a ridge at the distal end of the rod. To assemble the dual cover housing, the bottom cover is slid onto the frame from the top. The sides of the bottom cover slide over the arches, which may have rounded or sloped edges to ease this motion. The bottom cover then wedges between the arches and the bottom ledge. The top cover is then placed on the frame, and each rod is slid into a corresponding hole in the arches. The ridge at the distal end of each rod is thus forced through and past each arch. This locks each rod in place vis-a-vis each arch, thus locking the top cover onto the frame. However, before the top cover is placed on the frame, an electronic device may be placed inside the frame. For example, a battery and its attendant circuitry may be placed in the available space.

Figure 1:
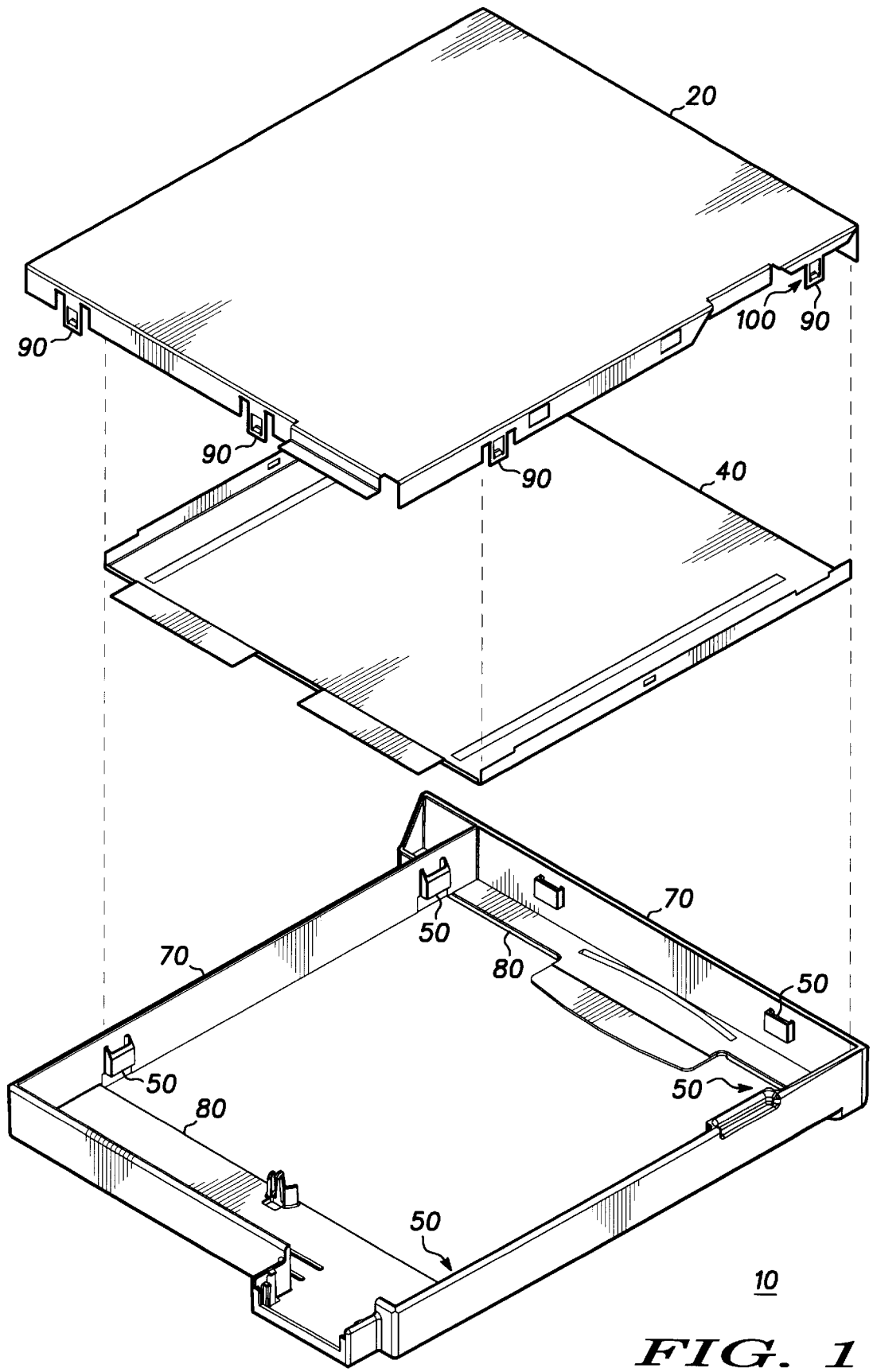
FIG. 1 is an exploded view of the housing of the present invention.

FIG. 1 shows one embodiment of the invention. The dual cover battery casing (10) of the present invention shows the top cover (20), the frame (30), and the bottom cover (40). An arch (50) on the wall of the frame (70) is shown, here approximately at the mid-point of the frame. In the embodiment shown in FIG. 1, the arch (50) is round, but any small loop may be used, such as a square, triangle, or pentagon. The opening (60) of the arch (50) is obviously between the arch and the wall (70) of the frame. The wall (70) of the frame also has a bottom ledge (80) as shown in FIG. 2 which causes the wall (70) of the frame to take on an L-shaped appearance.

Figure 2:
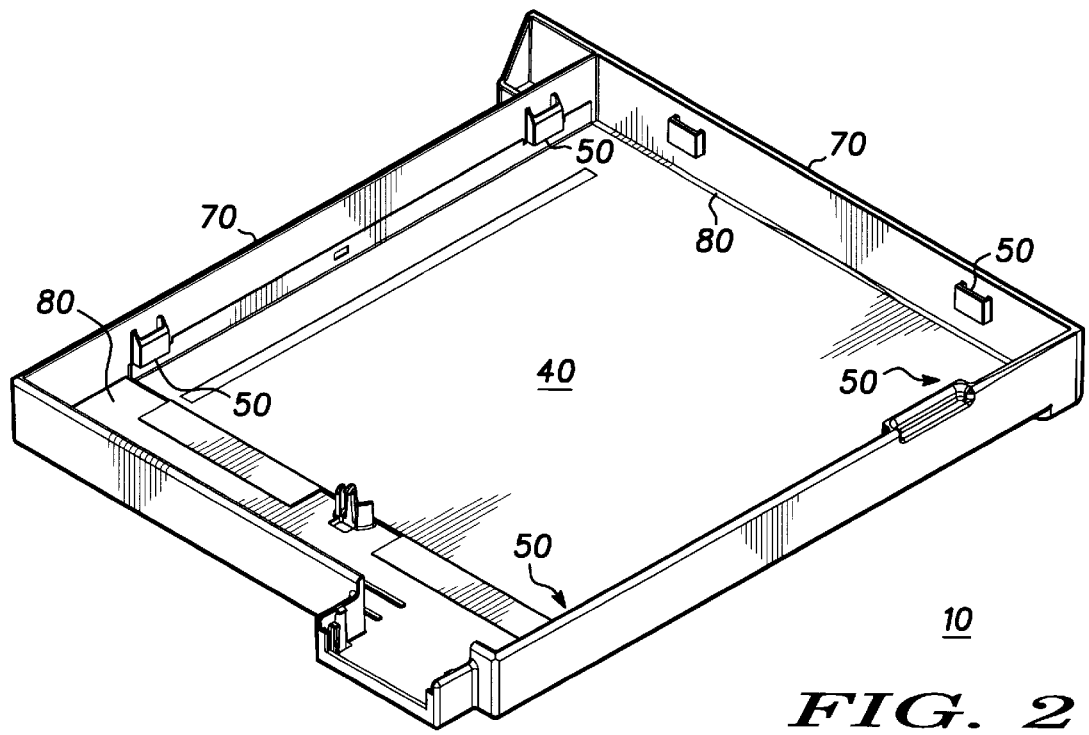
FIG. 2 is a perspective view of the frame of the housing of the present invention, showing the bottom cover inserted.
Figure 3:
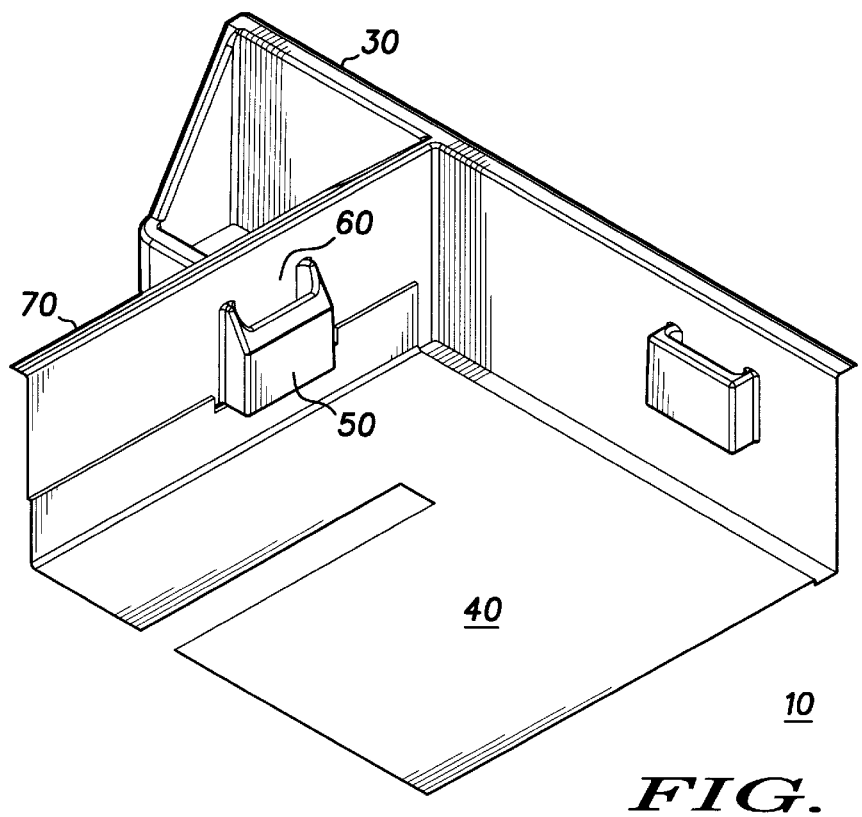
FIG. 3 is a close-up view of the frame of the housing of the present invention, showing the bottom cover inserted.
Figure 4:
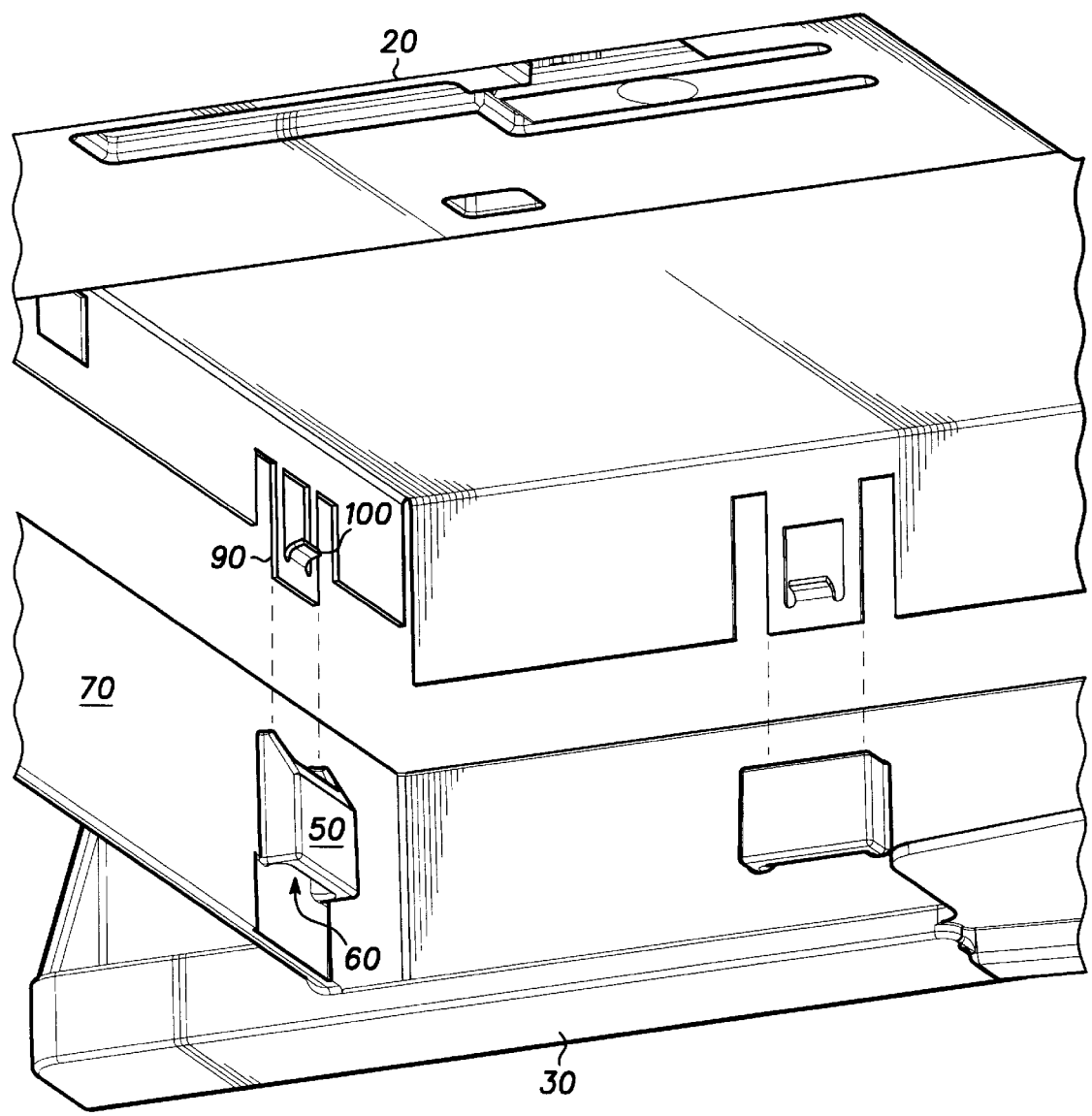
FIG. 4 is a perspective view of the top cover and the frame of the present invention.
Figure 5:
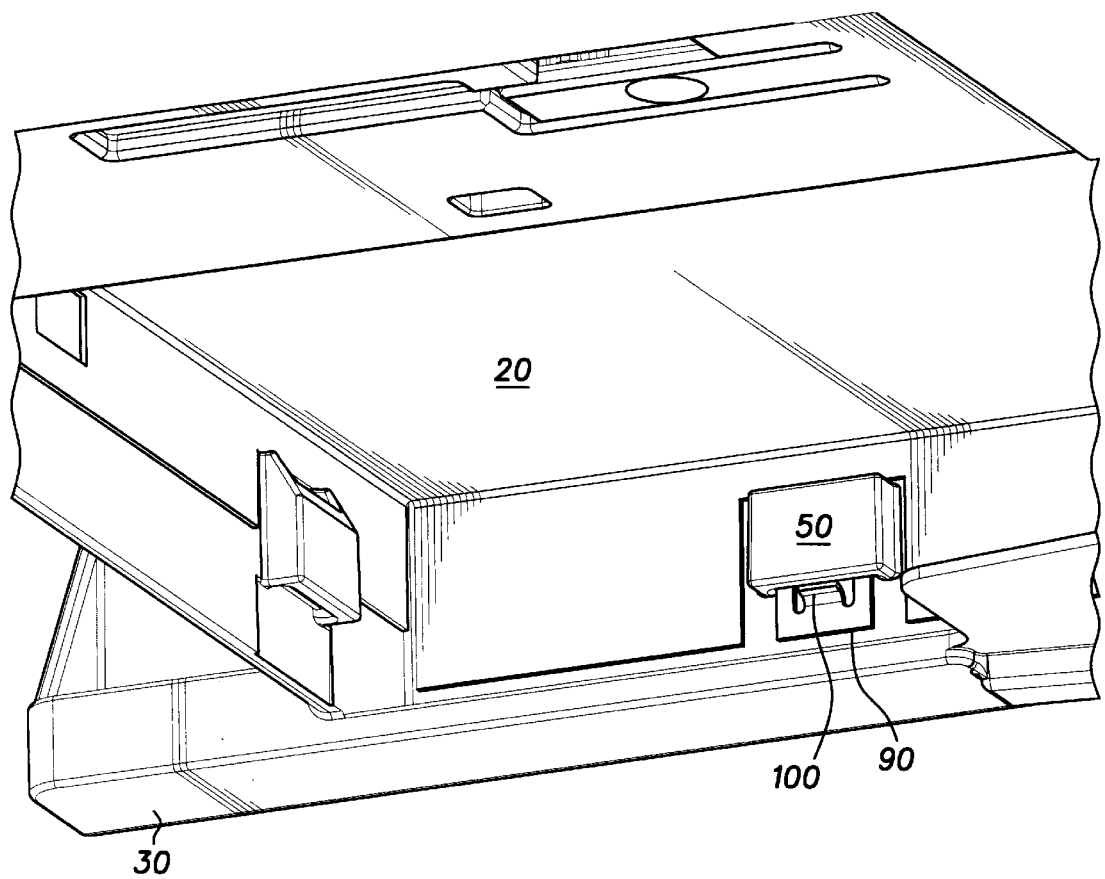
FIG. 5 is a perspective view of the top cover and the frame of the present invention, mated. However, this mating would not actually occur before the insertion of the bottom cover into the frame.

As shown in FIG. 1, FIG. 2, and FIG. 3, the bottom cover (40) is slid into frame (30) over arch (50) on the wall of the frame. Arch (50) may have rounded edges at the top, or be sloped at the top to ease this sliding. Bottom cover (40) is then wedged tightly between the bottom ledge (80) of the frame and arch (50) on the wall (70) of the frame. Then an electronic device such as a set of battery cells (not shown) and their attendant circuitry (not shown) may be placed on top of the bottom cover (40). Top cover (20) is then placed onto frame (30). Rods (90) extend from the underside of the top cover (20). [FIG. 4 and FIG. 5 show the top cover (20) disposed above the frame (30), although the two would not be joined until the bottom cover (not there illustrated) was placed in the frame.] Each rod (90) has a ridge (100) at the distal end of the rod. Each rod (90) has a corresponding opening (60) in each of arches (50) into which the rod slides when the top cover (20) is pressed onto frame (30). The ridge (100) at the distal end of each rod (90) slides through and slightly past each opening (60) in the arches (50). This locks the top cover (20) onto the frame (30). Thus, the arches (50) provide the dual function of fixing the bottom cover (40) in place and fastening the top cover (20) in place. This economic use of fastening mechanisms provides a housing with a small profile, while still using a mating system of very good power and reliability. Using each arch in this dual manner allows a larger arch to be used for the same size housing, increasing the strength and durability of the latching system.

In one embodiment of the invention suitably durable materials such as rubber, plastic, and metal may be employed for the top cover, bottom cover, frame, arches, and rods.

The present invention can be used for applications such as battery packs, chargers, and other electronic devices needing housings. It may also be employed for applications such as automotive parts, such as brake, tail and dome lights, door panels, and dashboard accessories.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A housing for an electronic device comprising: (a) a frame; (b) a top cover having a top side and a bottom side;

and (c) a bottom cover; wherein the frame has a ledge at its bottom, and an arch on one or more of the walls of the frame; and wherein the top cover has one or more rod-shaped projections protruding downward from the bottom side of the top cover, wherein each projection has a proximal end connected to the bottom side of the top cover, and a distal end not connected to the bottom side of the top cover, each projection having a ridge at the distal end of the projection;

wherein the bottom cover of the housing is wedged between the ledge and the arch, and wherein the top cover of the housing fits onto the frame;

wherein each rod is slid through a corresponding opening in the arch, and the ridge at the distal end of each rod slides through and past the arch opening, locking the rod in place vis-a-vis the arch.

2. The housing of claim 1, wherein the housing is made of a material selected form the group consisting of rubber, plastic, and metal.

3. The housing of claim 1, wherein the housing is the housing for a portable electronic device.

4. The housing of claim 1, wherein the housing is a housing for a battery.

* * * * *